Oct. 13, 1959 W. E. HIDDING 2,908,476
TUBE CLAMP
Filed Jan. 3, 1955
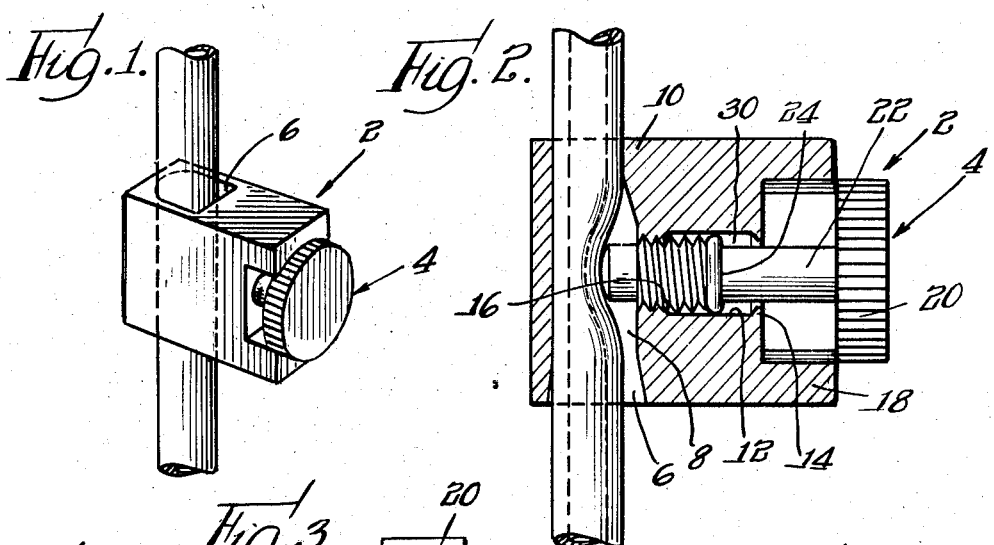
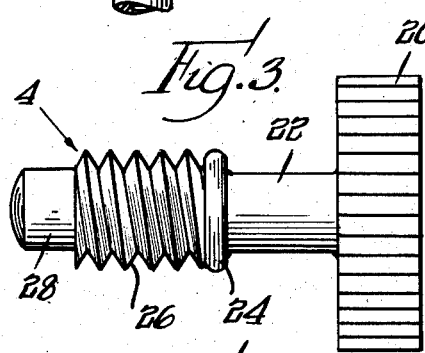
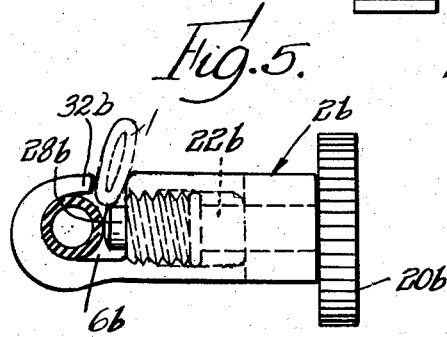
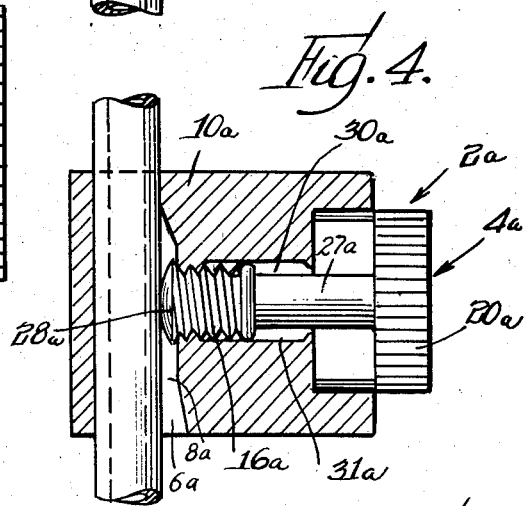
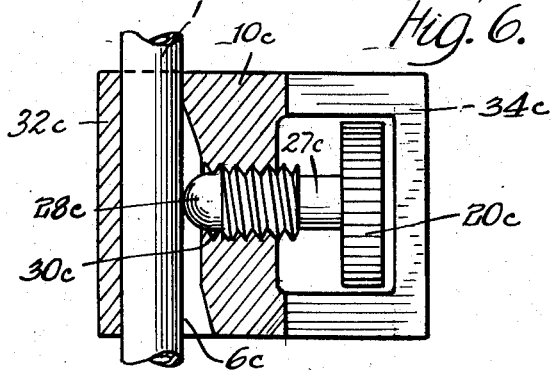
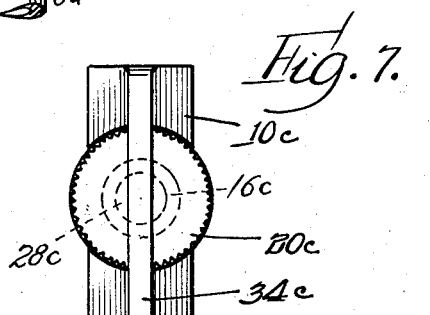
INVENTOR.
Walter E. Hidding
BY
atty.

United States Patent Office — 2,908,476 — Patented Oct. 13, 1959

2,908,476
TUBE CLAMP

Walter E. Hidding, Skokie, Ill.

Application January 3, 1955, Serial No. 479,442

3 Claims. (Cl. 251—8)

This invention relates generally to an improvement in clamps for hoses or tubing and more particularly relates to an improvement in a pinch type clamp for tubing made of resilient material.

The present invention has been designed to overcome a serious difficulty which has been noted wherever the deformable types of tubing or hoses require a clamp to restrict the flow of fluids or gases therethrough. For example, in the medical field it is quite common to introduce blood, saline solutions and other medicaments into a patient's veins through a sterile deformable tubing which has adjacent its free end a needle extending into the patient's vein. In such situations it is often desirable to be able to control the rate of flow of the fluid or other material so that the patient is able to assimilate the medicament being fed to him intravenously. I am well aware of devices presently in use such as blocks of solid material having a triangular cutout thereby providing a wedge shaped opening which restricts the flow of medicament through the tubing as the tubing is forced deeper and deeper into the wedge and toward the apex thereof. Further, I am aware of attempts to use various types of heavy gauge foil which can be wrapped around the tubing and cause to take a set thereby collapsing the tubing in its set position to cause the above described desired result.

It is one of the objects of my invention to provide an assembly consisting of a body element having a passage therethrough adapted to accept a flexible tubing and a stud element mounted in said housing at an angle to the aforementioned passage, said stud being adapted to traverse the passage in the housing and to collapse the tubing a desired and predetermined amount.

It is still another object of the invention to provide a stud element as described above whose movement into the passage of the housing can be controlled in small increments.

It is still another object of the invention to provide a stud designed to be pre-assembled with the housing element and after pre-assembly to be retained against inadvertent removal relative thereto.

It is still another object of the invention to produce at least certain embodiments of the invention out of plastic or non-metallic materials, and the design of the two elements comprising the invention are such as to facilitate the production of same through well known molding processes.

These and other objects of the invention will be more clearly understood by reading the following specifications and reference to the drawings wherein;

Figure 1 is a perspective drawing of the housing with the stud element mounted therein.

Figure 2 is a cross-sectional view taken along the line A—A in Figure 1.

Figure 3 is a plan view of one form of stud contemplated to be used in the device shown in Figure 1.

Figure 4 is a sectional view of a modified form of the invention showing the housing and stud pre-assembled.

Figure 5 shows still another embodiment of the invention, the only difference being in the formation of the passage adapted to accept the resilient tube.

Figures 6 and 7 show still another modification of the pinch clamp device contemplated by this invention.

Referring now to the drawings wherein like numerals have been used to describe similar elements in the various embodiments, Figure 1 shows one form of the invention consisting of a housing element 2 and a stud element 4 adapted to be mounted therein. The housing consists of a block of material, preferably non-metallic, having a bore 6 traversing the block and forming a passage having a diameter slightly in excess of the tubing with which it is to be used. Adjacent one end of the opening and in the vicinity of the side wall which the opening traverses, the hole is preferably flaired as seen at 8 to provide an enlarged opening to facilitate feeding the tubing initially through the housing, 2. Adjacent the other end of the passage a rib or shoulder 10 may be provided if it is desired that the clamp shall frictionally retain itself at any desired position along the length of the tubing on to which it is to be mounted. This rib or shoulder 10 causes the tubing to be arched or deflected sufficiently in the passage of the housing to cause a portion of the tubing to be flexed into frictional contact with the wall of the passage and thereby assure temporary retention of the housing on the tubing.

The housing has a second passage 12 adapted to accept a stud which will be described in detail hereinafter, said passage being angularly disposed relative to passage 6 and interconnecting passage 6 and the wall of the housing, which is parallel to passage 6 but adjacent the other end of the housing element. Passage 12 is provided with a shoulder 14 in the vicinity of its end farthest removed from passage 6 and at a distance based axially therefrom and in the direction of passage 6 provided with threaded means to accept the stud to be described. Passage 12 intermediate shoulder 14 and threads 16 is preferably of a slightly larger diameter and is of a length to cooperate with elements of the stud, as will be hereinafter described. As shown in the drawings, the housing is provided with flanges 18 to provide opposed walls which, as will be hereinafter seen, partially surround the head of the stud element when it is extended to a position traversing passage 6.

The stud element adapted to be pre-assembled in the aforementioned housing consists of a head 20 and a shank 22, the shank being provided at a position spaced from the head with a shoulder 24, threads 26 and a pilot or nose portion 28. Pending application of the stud into the passage 12 the crest diameter of the threads 26 and shoulder 24 which are of substantially the same diameter are forced past the shoulder 14, this being possible because of the inherent flexibility of the material from which the housing is fabricated. The overall length of the threaded section and shoulder is preferably slightly less than the length of the cavity 30 so that it may be retained in captured position between the shoulders 14 and the threads 16 without the threads of the stud being in engagement with the threaded portion of the housing.

In operation, after mounting of the housing on the flexible or collapsible tubing the stud element which has preferably been preassembled prior to the assembly of the housing on the tubing is rotated and as the threads of the stud enter into the threaded section of the housing, the nose portion is gradually extended into the passage the side faces of the body or housing present convenient finger gripping sections which assure the operator that as the nose portion of the stud element collapses the flexible tubing the body can be retained in proper position relative thereto to avoid a kinking action which might occur from said body otherwise. As rotation of the screw progresses, the tubing is collapsed in increments thereby constricting the hose or tubing at that point and it is obvious that the hose can be collapsed to any desired position to permit the fluid passing therethrough to pass only at a controlled rate of flow. It should be obvious that it is highly advantageous that upon retraction of the stud for any reason the stud is held in trap position relative to the housing so as to be readily available for its subsequent use in collapsing the tube. Further, these parts being relatively small, is advantageous that the stud and housing be kept in assembly to prevent losses of either of the elements. As has been heretofore indicated, a nose portion is provided on the stud for contacting the tube as the screw is fed into the passageway containing the tube. While I have shown one form of nose portion, it is obvious that any form which accomplishes the collapsing of the tube in the most expeditious manner may be provided.

I have shown a second form or embodiment of the invention in Figure 4 which differs only slightly from the embodiment shown in Figure 1. The main difference consists in the arrangement of the threaded section and locking shoulder elements and the corresponding change of the passage adapted to receive the stud. The stud is provided with a threaded section immediately adjacent the head (20a), said threaded section 16a extending along said shank to a position spaced from the extremity of the stud. Extending from said threaded section and forming the free end of the stud is a locking shoulder 28a which may consist either of an annular shoulder or a series of ribs or radially extending shoulder elements spaced peripherally about said stud. Intermediate said threaded portion is an interconnecting necked portion 27a which is of smaller diameter than the aforementioned threads or locking shoulders. The housing consists basically of all of the elements found in the embodiment shown in Figure 1 but passage 30a consists of a counterbore 31a and a threaded section 16a which interconnects the counterbore and passage 6a.

In operation the embodiment shows in Figure 4 parts in exactly the same fashion contemplated by the device shown in Figure 1 with the exception that in mounting the stud the nose portion 28a is forced through the threaded section, which is of slightly smaller diameter, into a position where it projects into the passage 6a. In this position the stud is retained against inadvertent removal and upon rotation of the stud the nose portion is projected into the passage 6a to accomplish the collapsing of the tube as has been heretofore described. It is preferable in this form to have mounted the housing on the tubing prior to the assembly of the stud in the housing, as the projecting nose portion 28a does tend to make passage of the tube therethrough difficult as it forms an obstruction which must be traversed. Obviously this difficulty can be overcome where desired by providing a passage 6a of a slightly greater diameter than the diameter of the tube.

Figure 5 merely shows the slight change in detail of the housing 2b, the change consisting of slotting the side wall 32b of the housing to form an opening from said side wall into the passage 6b permitting the tube or hosing 1 to be mounted readily thereby avoiding the necessity of feeding the tube through the passage 6a as has been heretofore described. The stud to be used in this embodiment can be of the form described in conjunction with Figures 1 or 4 as desired.

Figure 6 shows still another form of the invention wherein the housing is provided with passage 6c and an angularly disposed passage 30c which passage is threaded throughout its length. The stud consists of a head and a shank which shank may be threaded throughout substantially its entire length and provided with a nose portion as has been shown in other embodiments before described. The absence of a locking shoulder on the stud and cooperating means in the stud passage necessitates a provision of some means for assuring assembly of the stud relative to the housing and to accomplish this I have provided a strap or U shaped flange which overlies a stud head with said overlying flange or strap portion being spaced from the housing proper a distance less than the length of the screw element, thus assuring assembly. In order to accomplish initial assembly of the stud into the housing, the strap may be flexed away from the axis of the stud passage to permit threading of the fastener into the stud aperture and thereafter because of its resilient nature being permitted to return to its original position to accomplish what has been heretofore described.

In view of the foregoing there has been shown and described a novel form of a pinch clamp for a tubing including sufficient embodiments which are relatively inexpensive to manufacture and effective to overcome the problems presented in the clamping of deformable hoses or tubing where such is desired. Having thus shown and described my invention and realizing that what has been shown and described shall not limit me but were shown and described only for the purpose of illustrating my invention, what I claim is:

1. A valving device comprising a body of substantially rectangular cross section having side faces and end faces, the body being formed with a bore extending through said end faces, a flexible tubing extending through the bore, the length of the bore being so correlated with the flexibility of the tubing as to resist kinking of the tubing, the side faces being sufficiently close together and of sufficient extent that they may be firmly grasped by a thumb and finger of an operator, a second bore extending parallel to the end faces and intersecting the first mentioned bore, a clamping member threadedly mounted in the second bore and adapted upon reciprocation to control fluid flow through the tubing by deforming the walls of same, an actuator head mounted on the clamping member of a size that it is readily rotatable by the thumb and finger when grasped by an operator while the thumb and finger firmly grasp the side faces of the body whereby misalignment of the body and tubing may be resisted during actuation of the clamping member.

2. A plastic clamp device for use with collapsible tubing comprising a body and a threaded clamping member with a head of predetermined transverse dimension mounted therein, said body being relatively thin and of less dimension in that direction than the transverse dimension of said head to facilitate manual gripping of the body and rotation of the threaded member relative thereto, a pair of ears integral with, and extending from, said body and positioned on opposite sides of said head of predetermined dimension, said body being provided with a first bore located between the walls of said relatively thin body to receive the aforementioned complementary tubing, said bore located substantially at one end of said body, a second bore in said body angularly arranged relative to and intersecting said first bore and another surface of said body at the other end thereof, thereby providing a mounting aperture for such clamping member, said second bore being provided with helically arranged thread means in the vicinity of the intersection of said second bore with said first bore, means on said body cooperating with such threaded member to retain said member from axial separation of said body after being initially telescopically mounted in said second bore, said means consisting of a strap extending between said pair of ears and overlying the head of the threaded clamping member, said strap being sufficiently collapsible to permit initial mounting of the threaded clamping member into the second bore of the clamp body.

3. A tube clamping device comprising a body having a first bore extending therethrough for receiving a flexible tubing, a second bore intersecting the first bore and extending substantially perpendicular to the first bore, a clamping member having a flexible tubing engaging inner end and a manipulating head on the outer end and adapted to operatively engage the body, the second bore having a threaded portion proximate the first bore and the remaining portion being unthreaded with the outer end being formed with a stop shoulder portion, the clamping member having a threaded stem portion, an unthreaded stem portion and an enlarged stem stop portion therebetween, one of the stop portions being formed of resilient material capable of being sufficiently flexed upon insertion of the clamping member into the second bore to allow the enlarged stem stop portion to be forced by the body stop shoulder portion, the unthreaded bore portion being of greater axial length than the axial length of the threaded stem portion plus that of the enlarged stem stop portion, whereby upon disengagement of the threaded portions the threaded stem portion may be disposed within the unthreaded bore portion and engagement of the stop portions retains the clamping member within the second bore.

References Cited in the file of this patent

UNITED STATES PATENTS

| | | |
|---|---|---|
| 1,267,763 | Grikscheit | May 28, 1918 |
| 1,774,994 | Pfoutz | Sept. 2, 1930 |
| 2,094,264 | Crowley | Sept. 28, 1937 |
| 2,285,821 | Maloney | June 9, 1942 |
| 2,309,338 | Calaway | Jan. 26, 1943 |
| 2,518,895 | Jacobsson | Aug. 15, 1950 |

FOREIGN PATENTS

| | | |
|---|---|---|
| 21,170 | Great Britain | of 1899 |